US005870529A

United States Patent [19]

Kistler et al.

[11] Patent Number: 5,870,529

[45] Date of Patent: Feb. 9, 1999

[54] METHOD FOR CONTROLLING OR REGULATING THE INKING IN A PRINTING PRESS

[75] Inventors: Bernd Kistler, Eppingen; Wolfgang Geissler, Bad Schonborn; Harald Bucher, Eschelbronn; Werner Huber, Rauenberg, all of Germany

[73] Assignee: Heidelberger Druckmaschinen Aktiengesellschaft, Heidelberg, Germany

[21] Appl. No.: 958,887

[22] Filed: Oct. 27, 1997

Related U.S. Application Data

[63] Continuation of Ser. No. 643,601, May 6, 1996, abandoned.

[30] Foreign Application Priority Data

May 4, 1995 [DE] Germany ........................ 195 16 333.8

[51] Int. Cl.[6] ........................ G06K 15/00

[52] U.S. Cl. ........................ 395/104; 395/109; 101/365; 101/DIG. 45

[58] Field of Search ........................ 395/104, 109, 395/101, 114; 358/502–505, 512, 518; 382/167, 162, 166; 101/470, 471, 365, DIG. 49

[56] References Cited

U.S. PATENT DOCUMENTS

| | | | |
|---|---|---|---|
| 4,494,875 | 1/1985 | Schramm et al. | 356/402 |
| 4,660,470 | 4/1987 | Kramp et al. | 101/484 |
| 4,881,181 | 11/1989 | Jeschke et al. | 395/109 |
| 5,010,820 | 4/1991 | Löffler | 101/426 |
| 5,148,747 | 9/1992 | Rodi et al. | 101/450.1 |
| 5,467,436 | 11/1995 | Rodi et al. | 395/114 |

FOREIGN PATENT DOCUMENTS

| | | |
|---|---|---|
| 0 129 768 A2 | 1/1985 | European Pat. Off. . |
| 33 38 143 A1 | 5/1985 | Germany . |
| 36 20 152 A1 | 1/1987 | Germany . |
| 41 28 537 A1 | 3/1993 | Germany . |
| 42 29 267 A1 | 3/1994 | Germany . |
| 42 42 683 A1 | 6/1994 | Germany . |
| 43 21 179 A1 | 1/1995 | Germany . |

*Primary Examiner*—Dwayne D. Bost
*Assistant Examiner*—Tracy M. Legree
*Attorney, Agent, or Firm*—Herbert L. Lerner; Laurence A. Greenberg

[57] ABSTRACT

The invention relates to a method for controlling or regulating the coloration in a printing press, in which color metering elements are adjusted with the aid of a control or regulating device, and in which by means of at least one image pickup device associated with the printing press, picture signals are obtained continuously from the printed image and supplied to the control or regulating device. Provision is made so that a plurality of control or regulating algorithms are available for selection to the control or regulating device, and from among these algorithms, as a function of predeterminable parameters, a control or regulating algorithm is automatically selected and used.

6 Claims, 2 Drawing Sheets

METHOD FOR CONTROLLING OR REGULATING THE INKING IN A PRINTING PRESS

CROSS-REFERENCE TO RELATED APPLICATION

This application is a continuation of application Ser. No. 08/643,601, filed on May 6, 1996 abandoned.

BACKGROUND OF THE INVENTION

FIELD OF THE INVENTION

The invention relates to a method for controlling or regulating the coloration in a printing press, in which ink metering elements are adjusted with the aid of a control or regulating device, and in which by means of at least one image taking device associated with the printing press, image signals are obtained continuously from the printed image and supplied to the control or regulating device.

It has already been proposed in patent application DE 43 21 179 A1 that an image pickup device be disposed in a printing press, following the last printing unit and aimed at the surface of a material to be imprinted. The image signals from defined measurement locations of the image are processed into calorimetric measured values in a control or regulating device. These actual measured values are compared with nominal values, producing a comparison signal by means of which control signals for color metering elements of the inking units of the printing press are determined. Within methods for controlling or regulating the inking, it is known to use programs that achieve the fastest possible adjustment of inking to a predetermined value, and as a result the startup printing phase can be shortened and the number of spoiled copies reduced (DE 37 07 695 A1, DE 41 28 537 A1, DE 33 38 143 A1).

The known methods have the disadvantage that the control or regulating method is not equally valid for different variants of control operations when the method is performed, and hence the outcome of control or regulation in various cases is unsatisfactory.

SUMMARY OF THE INVENTION

According to the invention, the object of the invention is attained in that a plurality of control or regulating algorithms are available for selection by the control or regulating device, of which algorithms, as a function of predeterminable parameters, a control or regulating algorithm is automatically selected and used. As a result, adaptations to the particular prevailing circumstances, which it was not possible to handle in the prior art by varying control or regulating parameters, for instance, can be attained. Depending on specifications, the suitable regulating algorithm that best meets the situation is automatically selected from among the possible regulating algorithms available; the selection and use is done automatically, without requiring intervention of the user himself. In this way it is optimally possible to adapt the setting of the printing press ink feed to existing conditions.

It is preferably provided that the detected color measurement field composition of the image pickup device is used as the controlling parameter. This may for instance involve detection of a full-tone field or of a gray field of a control strip of the printed product. It is understood that it is also possible, instead of having the image pickup device detect a control strip to obtain signals, for a measurement to be done on the image subject itself; preferably, defined points of the subject are detected in the measurement. In addition or alternatively, the printing status of the printing press can be used as a parameter. What this is understood to mean is the current status of the print job, for instance, the setup phase or the production run phase. During the setup phase, different adjustments for the ink metering elements of the inking units are necessary than in the production run. It is accordingly possible—according to the invention—to use a different control or regulating algorithm during the setup phase than that used in the production run mode.

Finally, in addition or alternatively, it is also possible to take into account the type of color filter associated with the image pickup device as the parameter; that is, as a function of the hardware used, the control or regulating algorithm is selected from the selection of available algorithms and used. This selection can naturally also be done as a function of software—as already explained above.

The regulating algorithms are understood to be functions that have an effect on the reaction of the actuator (ink metering element), if the controlled variable that is picked up by the image pickup device varies with respect to a guide variable that represents a nominal value. Depending on the mathematical design of the regulating algorithm and the timing of the controller, a correspondingly different result is obtained. It is possible to use P-controllers, PI-controllers, PD-controllers, PID-controllers, and I-controllers.

In the course of this application, both control and regulating devices and characteristics are described. If only a control operator or a regulating operation or corresponding hardware components are mentioned, it is nevertheless to be understood that instead of a regulating characteristic a control characteristic and vice versa are intended to have validity, since the inking of a printing press can be adjusted by means of either a control method or a regulating method.

In accordance with the invention there is provided a method for controlling and regulating the inking in a printing press, in which ink metering elements are adjusted with the aid of a control and regulating device, and in which by means of at least one image pickup device associated with the printing press, image signals are generated continuously from the printed images and supplied to the control and regulating device, which comprises the steps of providing a plurality of control or regulating regulating algorithms for selection to operate the control and regulating device, and selecting automatically from the algorithms, as a function of predetermined control parameters, a control and regulating algorithm for automatically adjusting the ink metering elements.

According to a further feature there is provided a step of using a detected color measurement field composition from the image pickup device as the control parameter.

According to still another feature, the method includes the step of using the printing status of the printing press as the control parameter.

According to an additonal feature, the method includes the step of using the type of color filter associated with the image pickup device as the control parameter.

According to a still further feture the method includes the step of using at least one of the regulating algorithms of P- and/or PI- and/or PD- and/or PID- or I-type function, and according to a concomitant feature the method includes the step of detecting with the image pickup device at least one color measurement field which is located in at least one of the image subject and/or in a control strip of the printed copy.

Other features which are considered as characteristic for the invention are set forth in the appended claims.

Although the invention is illustrated and described herein as embodied in a method for controlling or regulating the inking in a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing illustrates the invention in terms of an exemplary embodiment.

DESCRIPTION OF THE PREFERRED EMBODIMENTS

Figure 1:
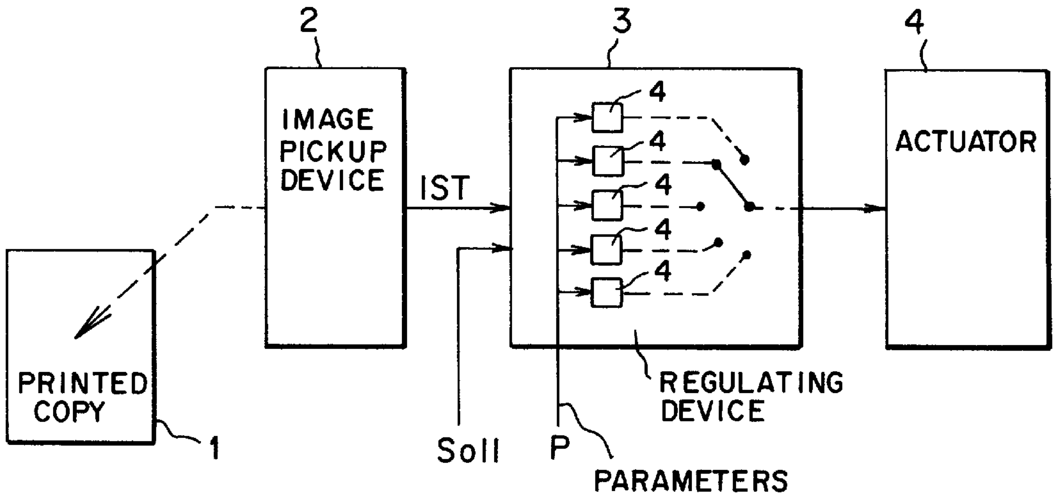
FIG. 1 is a block circuit diagram that illustrates the method for controlling or regulating the ink in a printing press.

FIG. 1 shows diagrammatically a printed copy 1, located in a printing press, not shown; the printed copy 1 has passed through a plurality of printing units and as a result has an image subject printed thereon, not shown. By means of an image pickup device 2 of the printing press, the subject and/or a control strip—if such is present—is optically detected at defined points of the print, so that in this way image signals are obtained, which are supplied as control values representing actual image values to a regulating device 3. The regulating device 3 is also supplied with a nominal value Soll as a guide variable, which is compared with the actual value Ist to form a control correction.

As a function of predetermined parameters P, from many available regulating algorithms, the regulating device 3 selects the regulating algorithm that leads to the best possible outcome of regulation with respect to the specified parameter P. The parameters P may in particular be the color measurement field composition of the image pickup device and/or the print status of the printing press and/or the possibility of using a color filter associated with the image pickup device. With respect to the color measurement field composition, a distinction is made, for instance, as to whether a full-tone field of a window in the color zone, such as a black, cyan, magenta or yellow field, or a gray field will be scanned by the image pickup device. The gray field is a field in which all the colors otherwise used are printed on top of one another. If the measurement for ascertaining the image signals is done not from a control strip but rather from the image subject or in other words in the image, then there as well—depending on the location of the measurement field—a selection made automatically from among the available regulating algorithms. The selected regulating algorithm is used for the further processing of the control deviation, and at the output of the regulating device 3 it produces a value which triggers an actuator 4 that actuates a color metering element or elements of the inking units of the printing press.

The printing press preferably has zonally-arranged ink metering; that is, zonally acting ink metering elements are provided, and each ink metering element is regulated in a suitable manner as described above.

In addition or alternatively to the aforementioned selection of a regulating algorithm in terms of the color measuring field composition, it is also possible to choose the algorithm in accordance with the print status, for instance whether the press is in a setup run or is already in the production run state. Color filters, and the like, can also be taken into account in the choice of regulating algorithm.

Figure 2:
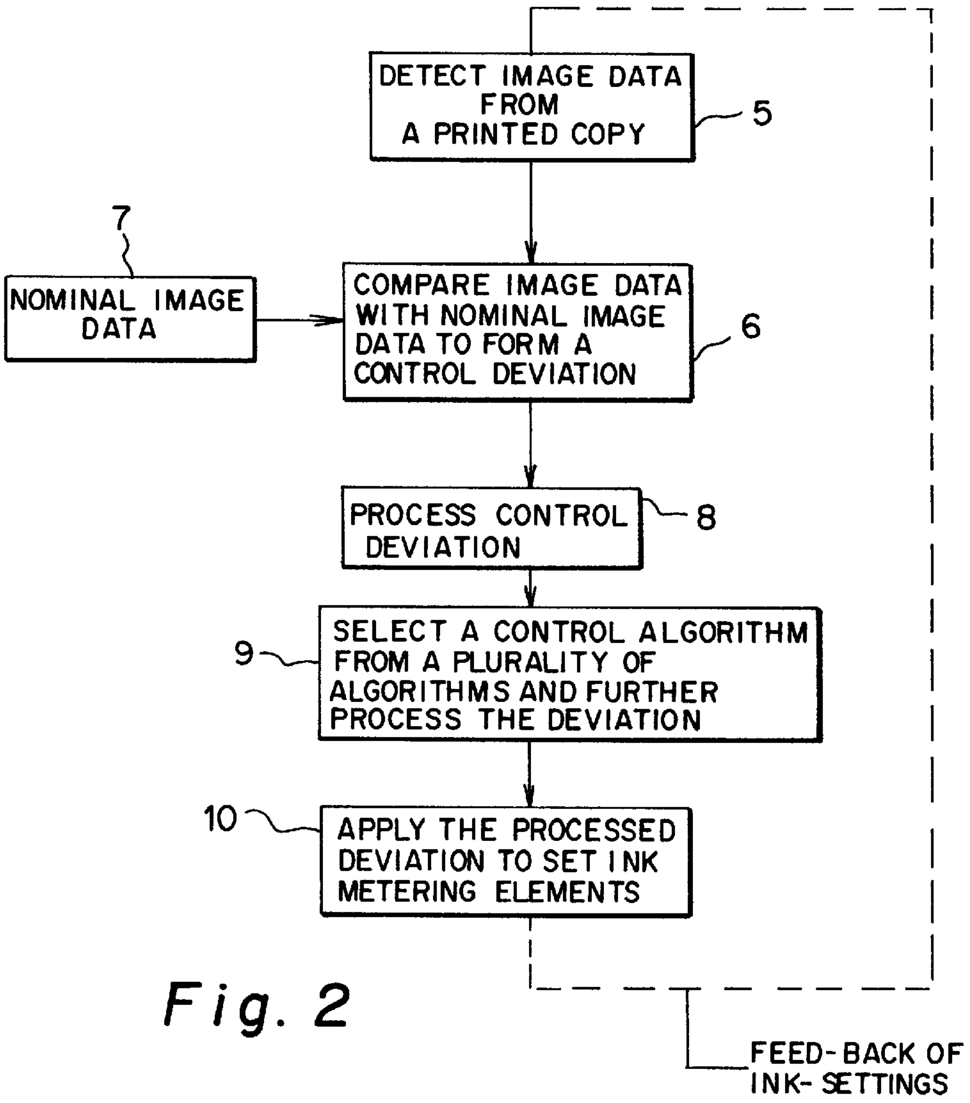
FIG. 2 is a flowchart of the control or regulating method.

In FIG. 2, the method is explained in further detail with reference to a flowchart. First, in step 5 image data of a printed copy are detected and then compared in step 6 with nominal image data that come from a nominal data block 7 to form a control deviation. In step 8, the control deviation formed from the comparison of nominal and actual values, is further processed, and—as a function of parameters P—a selection of a regulating algorithm is made from many available regulating algorithms, and—after further processing of the control deviation with the regulating algorithm—the outcome is used in step 9 to set an actuator. The setting leads to the adjustment of an ink metering element (step 10) of the inking mechanism or mechanisms of the printing press, not shown. This adjustment of the color metering elements leads to a change in the coloration of the subject or control strip that has been detected by means of the optical image pickup device. The result is the feedback indicated as dashed line 11.

Figure 3:
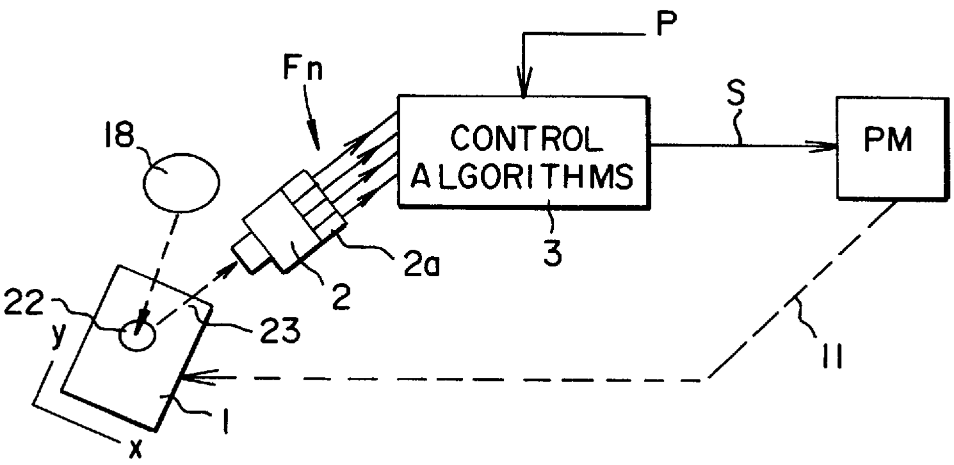
FIG. 3 is a diagram of a pickup device having color filters, receiving image color information and providing image color information via a set of control algorithms to a printing machine.

In FIG. 3 the printed sheet 1 is illuminated by a polychromatic light source 18. An image element 22 reflects light rays 23 to 25 the image pickup device 2, which includes a set of color filters 2*a* having one filter for each ink color used in the printing. Image signals $F_n$ sorted in the respective ink colors issue from the image pickup device 2 to a storage 3 holding a plurality of control algorithms, of which one is to be selected on the basis of a control parameter P. The selected algorithm is transmitted via connection S to the ink control devices of the printing machine PM. Printed sheets 1 issue from the printing machine PM following the feedback path 11 to again being inspected by the light source 18, and the image pickup device 2 and new image data inputs are entered into control algorithm storage 3. Based on the image data the same or a new and more suitable algorithm may be transmitted to the printing machine P, until the best suitable algorithm is used for printing.

Figure 4:
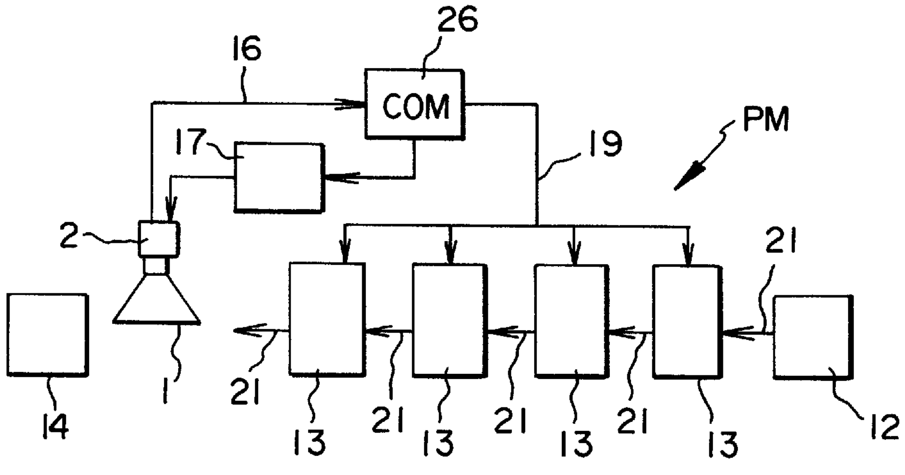
FIG. 4 is a block diagram of a typical printing machine.

FIG. 4 is a block diagram of a printing machine P arranged to operate on the basis of the invention.

In FIG. 4 the printing machine PM is composed of four printing units 13, each printing one of the colors of which the printed image is formed. A web or sheets 1 to be printed issue from a feeder 12 and move through the machine as indicated by arrows 21, to a stacker or receiver 14. After leaving the last printing unit the image is scanned by an imaging pickup device 2 of conventional construction. The imaging device 2 transmits on an output connection 16 electrical signals that represent a color vector $F_n$ for all image regions 11 of the image to a computer 18. The computer performs the computations required for processing the image as described above and described in more detail in the flowchart of FIG. 2.

The computer 26 generates output signals on lead 19 which numerically represent the ink feed settings, i.e. the setting of a respective ink gap for each printing unit 13. The ink gap may be controlled as a common ink knife for each printing unit 13, or as individual ink zone gaps for each ink zone for each printing unit 13.

On the basis of the method of the invention, it is possible to automatically use an optimal regulating algorithm at all times, so that the best possible outcomes of printing are attained.

We claim:

1. A method for controlling and regulating the inking in a printing press in which ink metering elements are adjusted with the aid of a control and regulating device, and including at least one image pickup device associated with the printing press, the method which comprises the steps of:

generating continuously with the image pickup device image signals from the printed images, supplying the image signals to the control and regulating device, providing a plurality of control or regulating algorithms for selection, in response to the reaction of the control and regulating device, to operate the control and regulating device, and selecting automatically from the algorithms, as a function of at least one predetermined control parameter, a control and regulating algorithm for automatically adjusting the ink metering elements.

2. The method of claim 1, further comprising the step of:

using a detected color measurement field composition from the image pickup device as the parameter.

3. The method of claim 1, further comprising the step of using the printing status of the printing press as the parameter.

4. The method of claim 1, further comprising the step of using the type of color filter associated with the image pickup device as the parameter.

5. The method of claim 1, further comprising the step of using at least one of the regulating algorithms of P- and/or PI- and/or PD- and/or PID- or I-type function.

6. The method of claim 1, further comprising the step of detecting with the image pickup device at least one color measurement field which is located in at least one of the image subject and/or in a control strip of the printed copy.

* * * * *